A. RAICH.
LUNCH PAIL.
APPLICATION FILED AUG. 4, 1921.
1,434,314.
Patented Oct. 31, 1922.
2 SHEETS—SHEET 1.
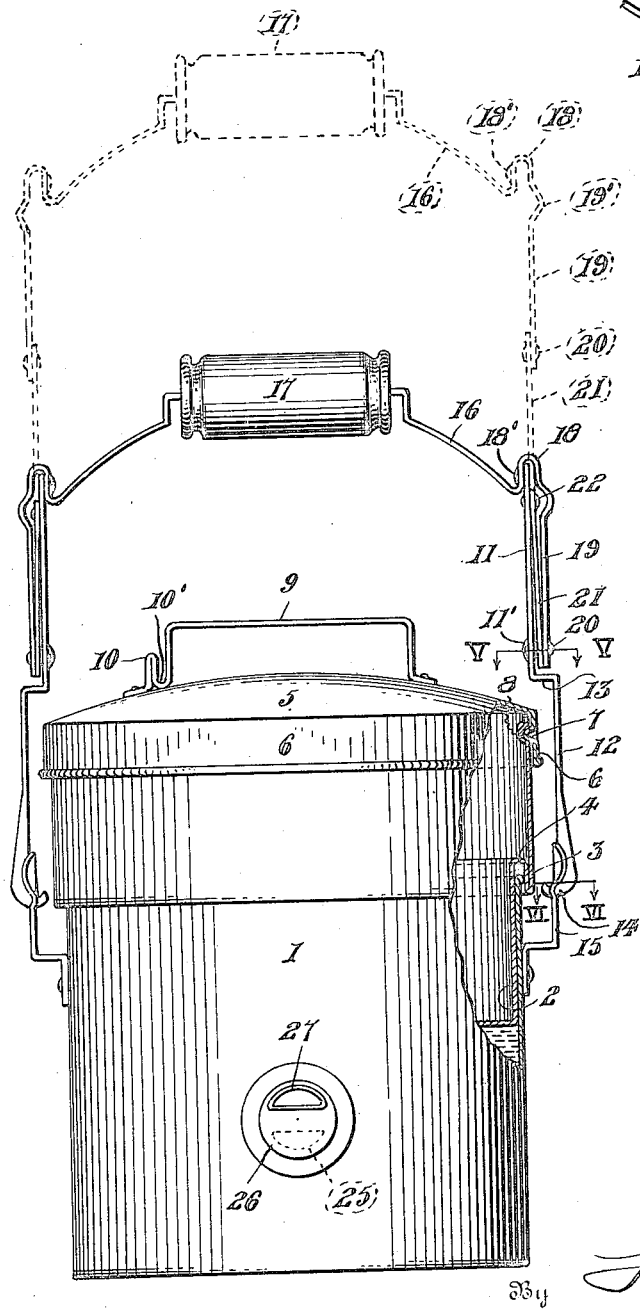
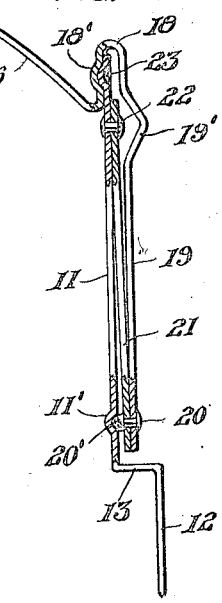
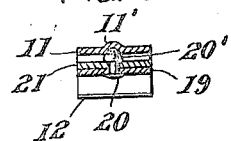
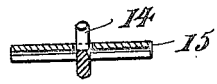
Inventor
A. Raich
By
F. A. Bryant
Attorney A. RAICH.
LUNCH PAIL.
APPLICATION FILED AUG. 4, 1921.
1,434,314.
Patented Oct. 31, 1922.
2 SHEETS—SHEET 2.
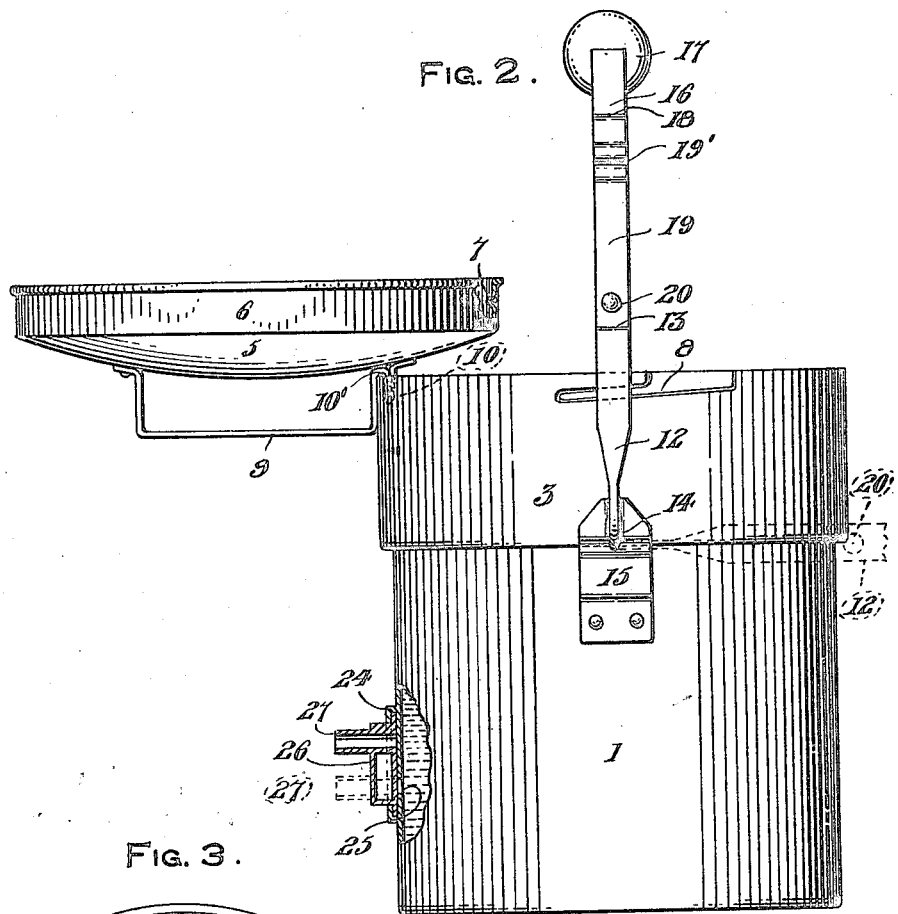
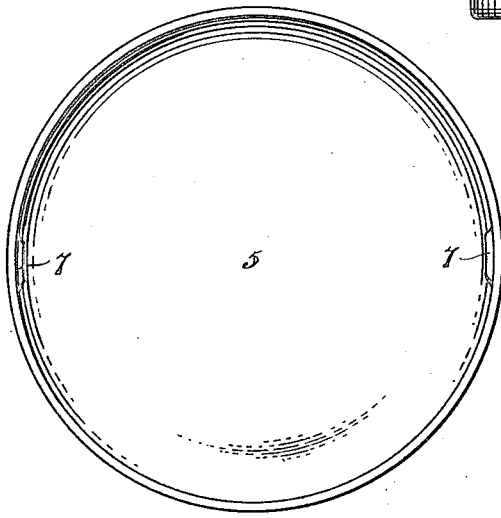
Inventor
A. Raich
By F. A. Bryant
Attorney Patented Oct. 31, 1922.

1,434,314

UNITED STATES PATENT OFFICE.

ANTHONY RAICH, OF KEMMERER, WYOMING.

LUNCH PAIL.

Application filed August 4, 1921. Serial No. 489,767.

*To all whom it may concern:*

Be it known that I, ANTHONY RAICH, a citizen of Jugo-Slavia, residing at Kemmerer, in the county of Lincoln and State of Wyoming, have invented certain new and useful Improvements in Lunch Pails, of which the following is a specification.

This invention relates to certain new and useful improvements in lunch pails and has particular reference to a lunch pail or bucket especially designed for miner's use wherein the lower section of the pail is adapted to contain water either for use in filling a carbide lamp or for heating the lunch contained in the upper compartment of the pail.

A further object of the invention has particular reference to the cover of the pail and its handle with the handle constructed for mounting in an inverted position upon the side of the upper section of the pail to constitute a plate or tray when eating.

A further object of the invention has particular reference to the handle construction of the pail, wherein the handle may be disposed in a position adjacent the body of the pail, or moved to a position extended from the pail to permit the same to be carried upon the arm of a person, leaving free use of the hands.

With the above general objects in view and others that will become apparent as the nature of the invention is better understood, the invention consists in the novel form, combination and arrangement of parts hereinafter more fully described in connection with the accompanying drawing, and in which like characters of reference indicate corresponding parts throughout the several views.

In the drawing,

Figure 1 is a side elevational view partly in section of a lunch pail constructed in accordance with the present invention, the handle for the pail being shown extended by dotted lines, Figure 2 is a side elevational view partly in section showing the valve mechanism for the lower water containing section of the pail with the cover for the upper section inverted and supported on the upper section, Figure 3 is a bottom plan view of the cover showing the inwardly directed diametrically opposite lugs cooperating with the bayonet slots on the upper section of the pail, Figure 4 is a detail sectional view of a portion of the handle showing the extensible hinged sections, Figure 5 is a detail sectional view taken on line V—V of Figure 1 showing the pin and socket connection between the handle sections for holding the same in adjusted position, and Figure 6 is a detail sectional view taken on line VI—VI of Figure 1 showing the hook connection between the handle and the body of the pail.

Referring more in detail to the accompanying drawing, there is illustrated a lunch pail embodying a lower container section 1, cylindrical in cross section and adapted to have supported therein in telescopic relations, a lunch containing pail section 2 formed with an outwardly directed annular bead 3 providing a groove within which a gasket 4 is positioned for engagement with the upper edge of the annular wall of the lower container 1, this construction being clearly shown in Figure 1.

The cover for the lunch pail section 2 embodies an upper wall 5 and a cylindrical side wall 6 with inwardly directed diametrically opposite lugs 7 carried by the side wall 6 as shown in Figures 1 to 3 adapted for reception in the bayonet grooves 8 formed in the outer face adjacent the upper end of the lunch containing section 2. By positioning the lugs 7 in the open ends of the bayonet-shaped slots as clearly shown in Figure 2, and partially rotating the cover in the proper direction, the cover will be interlocked with the upper pail section.

The cover is also employed as a plate or serving tray, the handle 9 secured to the cover having a portion of one end thereof bent upon itself as at 10, as shown in Figures 1 and 2 to form a groove or channel 10' to receive the upper edge of the upper lunch containing pail section 2 with the cover inverted, this construction providing a substantial mounting for the cover section upon the body of the pail.

The carrying handle for the pail embodies a series of arms and links. the arms embodying upper and lower portions 11 and 12 connected by an angularly bent portion 13 while hooks 14 carried by the lower ends of the arm portions 12 are received in openings formed in the angle brackets 15 secured to the opposite sides of the base section 1. The handle embodies an upper section 16 carrying a central gripping portion 17 with the opposite ends of the section 16 bent upwardly as at 18 and then downwardly as at 19 for pivotal mounting as at 20 to one end of a link 21, the other end of the link being pivoted as at 22 at a point adjacent the upper end of the upper arm section 11. The portion 19 of the handle is bent outwardly as at 19' to provide a clearance for the pivotal connection 22 between the link and the arm sections and the link 21 in the full line positions shown in Fgures 1 and 4, the head 20' of the pivot pin 20 is received in a notch 11' formed in the arm 11 adjacent the angularly bent portion 13, while the upwardly bent portion 18 of the handle 16 has a socket 18' formed therein for the reception of the inwardly pressed portion 23 in the upper end of the arm section 11.

The lower water containing section 1 may be filled by removing the lunch containing section 2 and the water in the section 1 discharged through a valve opening in the side wall thereof, the valve construction being clearly shown in Figures 1 and 2 as embodying an annular flange 24 surrounding an eccentric opening 25 in the side wall of the container 1 with a valve body 26 having an eccentric outlet spout 27 rotatable in said flange guide, the valve body when in the full line position shown in Figure 1 closing the opening 25 and adapted to be rotated to position the spout 27 into communication with the opening 25 as shown by dotted lines in Figure 2 to permit the water in the container 1 to be discharged through the spout.

From the above detailed description, it is believed that the construction and operation of the present invention will at once be apparent, it being noted that the cover 5 for the upper pail section 2 may be removed and supported in an inverted position upon the side wall of the upper section as shown in Figure 2 to constitute a plate or serving tray for the lunch. The water in the lower pail section 1 may be heated if desired, or may be alone employed for filling carbide lamps through the valve spout as described.

The extensible handle sections will permit the lunch pail to be carried in the usual manner by the hand when in the full line position shown in Figure 1 with the grip 17 being positioned adjacent the body of the pail, and the connections between the arms 11 and 19 and links 21 maintaining the same in fixed position. Should it be desired to suspend the lunch pail upon the arm, the handle sections are extended to the dotted line position shown in Figure 1 leaving free use of the hands for any purpose desired.

While there is herein shown and described the preferred embodiment of the invention, it is nevertheless to be understood that minor changes may be made in the form, combination and arrangement of parts without departing from the spirit and scope of the invention as claimed.

What is claimed as new is:

1. A handle for lunch pails comprising side arms, handle sections disposed above said arms with the sides of the handle sections overlapping the arms, link connections between the free ends of the arms and the handle sections.

2. A handle for lunch pails comprising side arms, handle sections disposed above said arms with the sides of the handle sections overlapping the arms, link connections between the free ends of the arms and the handle sections and cooperating means carried by the handle sections and arms for holding the same in overlapped relation.

3. In a handle for lunch pails of the type comprising a container provided with upper and lower interfitting sections, angle brackets carried by the lower section, an extensible handle secured to the angle brackets and including perpendicular arms, a handle having side extensions, link connections between the upper ends of the arms and the side extensions, and cooperating means carried by the arms and side extensions for holding the handle section in folded adjusted position.

In testimony whereof I affix my signature.

ANTHONY RAICH.